United States Patent
Le Floch et al.

(10) Patent No.: US 8,311,128 B2
(45) Date of Patent: Nov. 13, 2012

(54) METHOD OF PROCESSING A CODED DATA STREAM

(75) Inventors: Hervé Le Floch, Rennes (FR); Frédéric Maze, Langan (FR)

(73) Assignee: Canon Kabushiki Kaisha, Tokyo (JP)

( * ) Notice: Subject to any disclaimer, the term of this patent is extended or adjusted under 35 U.S.C. 154(b) by 563 days.

(21) Appl. No.: 12/425,196

(22) Filed: Apr. 16, 2009

(65) Prior Publication Data

US 2009/0262836 A1  Oct. 22, 2009

(30) Foreign Application Priority Data

Apr. 17, 2008  (FR) ...................................... 08 52614

(51) Int. Cl.
*H04N 11/02* (2006.01)
(52) U.S. Cl. .. 375/240.27; 725/86; 725/90; 375/240.16; 375/240.24
(58) Field of Classification Search . 375/240.01–240.29
See application file for complete search history.

(56) References Cited

U.S. PATENT DOCUMENTS

| | | | | |
|---|---|---|---|---|
| 5,680,322 | A | 10/1997 | Shinoda | 364/514 A |
| 6,104,757 | A * | 8/2000 | Rhee | 375/240.12 |
| 7,058,200 | B2 | 6/2006 | Donescu et al. | 382/100 |
| 7,478,241 | B2 | 1/2009 | Le Floch | 713/176 |
| 2003/0206549 | A1 * | 11/2003 | Mody et al. | 370/390 |
| 2005/0089104 | A1 * | 4/2005 | Kim | 375/240.27 |
| 2005/0144643 | A1 * | 6/2005 | Hakenberg et al. | 725/86 |
| 2005/0207406 | A1 * | 9/2005 | Reme | 370/389 |
| 2006/0182178 | A1 | 8/2006 | Oi et al. | 375/240.16 |
| 2006/0256785 | A1 * | 11/2006 | Nagai et al. | 370/389 |
| 2007/0195880 | A1 | 8/2007 | Henocq et al. | 375/240.13 |
| 2008/0130739 | A1 | 6/2008 | Le Floch et al. | 375/240.01 |
| 2008/0144725 | A1 | 6/2008 | Henocq et al. | 375/240.27 |
| 2009/0041132 | A1 | 2/2009 | Le Floch et al. | 375/240.26 |

FOREIGN PATENT DOCUMENTS

GB  2 347 038 A  8/2000

OTHER PUBLICATIONS

Feamster, N.G., "Adaptive Delivery of Real-time Streaming Video", Master Thesis, MIT, May 23, 2001.
Raman, S. et al., "ITP: An Image Transport Protocol for the Internet", IEEE/ACM Transactions on Networking, vol. 10, No. 3, Jun. 1, 2002, pp. 297-307.

* cited by examiner

*Primary Examiner* — Joseph Ustaris
*Assistant Examiner* — Hang Gao
(74) *Attorney, Agent, or Firm* — Fitzpatrick, Cella, Harper & Scinto (57) ABSTRACT

A method of processing a coded data stream of a current image on a receiving device, the data stream being organized into packets, comprises a step of detecting a lost packet.
It further comprises:
  a step of estimating, prior to the decoding of the current image, an importance criterion of the lost packet, the importance criterion being determined from at least one decoded preceding image; and
  a step of requesting retransmission of the lost packet depending on said estimated importance criterion.
Use in particular for improving the transmission of a video.

17 Claims, 9 Drawing Sheets

METHOD OF PROCESSING A CODED DATA STREAM

FIELD OF THE INVENTION

The present invention concerns a method and device for processing a data stream.

More particularly, it concerns the processing on a reception device of a stream of coded data from an image.

BACKGROUND OF THE INVENTION

When a data stream is transmitted between a sending device and one or more receiving devices, over a network, data of the data stream are liable to be lost In the case of a packet-switched communication network, the data stream is cut up into network packets. On transmitting the data stream so cut up, network packets may get lost.

The receiving device is adapted to detect the network packets lost on transmission of the data stream.

Once the receiving device knows the lost network packets, it requests the sending device to retransmit the lost network packets.

If the number of these lost network packets to retransmit is high, the network may be congested.

One solution for avoiding congestion of the network consists of requesting the retransmission of certain lost network packets instead of requesting the retransmission of all the network packets. The lost network packets to request are determined according to the importance of the network packet.

The importance of a network packet is evaluated according to the visual impact of a lost network packet on an image.

The visual impact depends on the quantity of lost data, that is to say that if a first lost packet contains a higher quantity of data than a second lost packet, the visual impact on the image of the first lost packet is greater than the visual impact of the second lost packet. Thus, the first lost packet is considered as more important than the second lost packet.

Thus, a lost packet containing a high quantity of data is considered important since its loss risks causing a high visual impact on the image to decode, and thus degrading the quality of the image.

Figure 1:
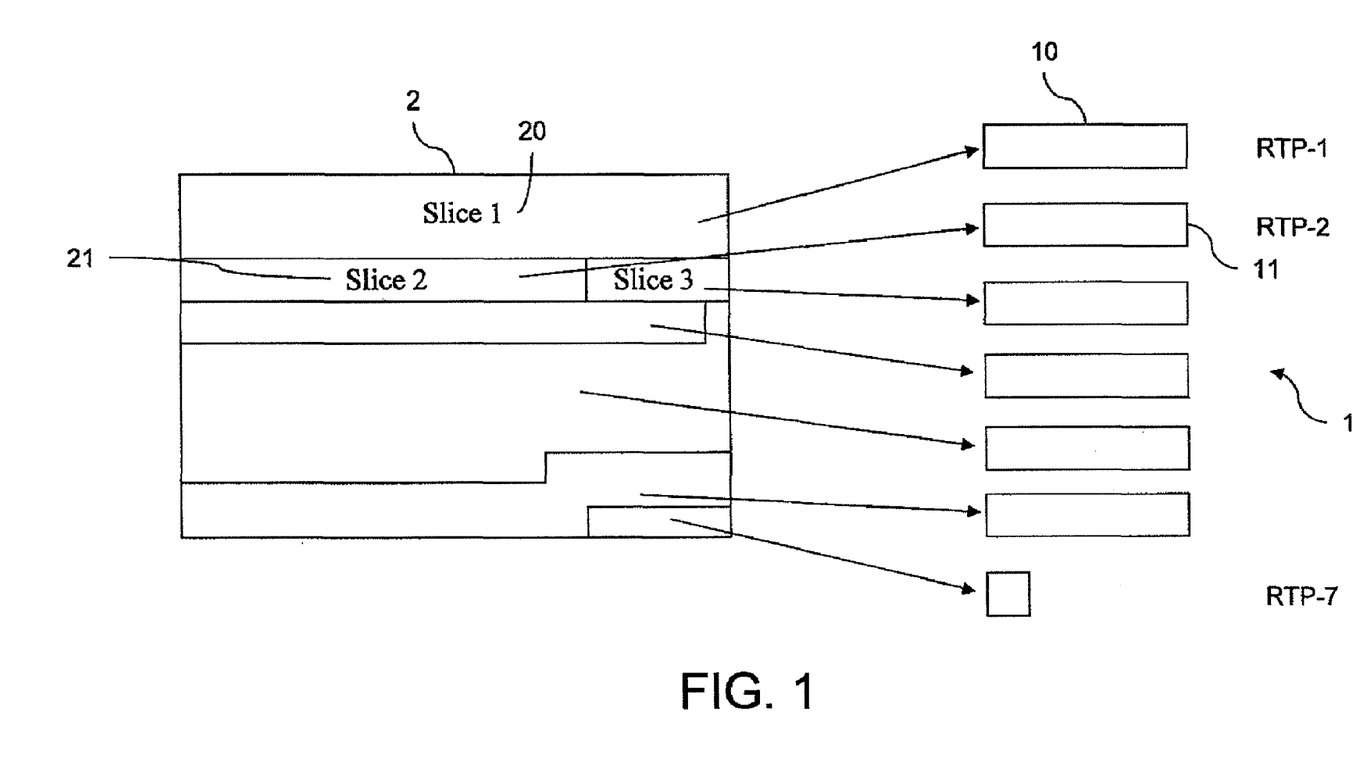
FIG. 1 is a diagram of an image and of network packets.

For example, FIG. 1 represents the network packets 1 corresponding to a video image 2. Each network packet 10, 11 comprises the data necessary for the decoding of a part of the image 2. On coding the video image 2, the image 2 has been cut up into several parts 20, 21 and each part has been compressed using a compression algorithm. Thus, a first image part 20 (named for example "slice" in MPEG language) is compressed and forms a first network packet 10, and a second image part 21 is compressed and forms a second network packet 11.

The sizes of the network packets 10, 11 are often almost the same. Nevertheless, the area of the first network packet 10 on the image has a higher value than the area of the second network packet 11.

Consequently, if the first and second packets 10, 11 are lost, the visual impact of the first network packet 10 on the image 20 is greater than the visual impact of the second network packet 11. That is to say that the first network packet 10 is considered as more important than the second network packet 11.

The receiving device knows the importance of each packet corresponding to an image, only once the image has been decoded.

Thus, once the importance of the packets is known, the receiving device can request the retransmission of the packets considered as important to have an acceptable image quality.

Nevertheless, the fact of decoding the image before requesting the retransmission of the packets considered to be important gives rise to a non negligible delay between the reception of the packets and the request for retransmission of the lost packets, and may have very considerable consequences on certain video applications.

SUMMARY OF THE INVENTION

The present invention is directed to solving the aforesaid limitations and to providing a method of processing a coded data stream of a current image and a device associated with that method, making it possible to determine the importance of a packet at its reception on a receiving device, in order to take a decision on the retransmission request, with a small delay between the reception of the packets and that decision taking.

To that end, according to a first aspect, the present invention concerns a method of processing a coded data stream of a current image on a receiving device, the data stream being organized into packets, comprising a step of detecting a lost packet.

According to the invention, the processing method comprises:
  a step of estimating, prior to decoding said current image, an importance criterion of said lost packet, said importance criterion being determined from at least one decoded preceding image; and
  a step of requesting retransmission of the lost packet depending on the estimated importance criterion.

Thus, by determining an importance criterion of a packet from the preceding images, the visual impact of a lost packet on a current image may be estimated without awaiting the decoding of the image.

Consequently, the decision to request retransmission of the lost packet is taken without introducing a long delay between the detection of a lost packet and the request for retransmission of the packet.

Moreover, the receiving device may receive network packets from any particular sending device, without being exigent as to the characteristics thereof, the receiving device being adapted to calculate the importance of the lost network packets and to determine, on the basis of that importance, the lost network packets for which it must request retransmission.

Due to not requesting the retransmission of the lost network packets which do not have much importance for the quality of the image, the bandwidth of the network is used efficiently and the network is not congested.

According to one embodiment, the step of estimating the importance criterion comprises a step of estimating the area of a current image part corresponding to the data contained in the lost packet.

Thus, the receiving device estimates the area of the current image part which should have been occupied by the data contained in the lost packet after decoding. Consequently, this current image part cannot be decoded.

In practice, at the retransmission requesting step, the lost packet is requested when the area of the estimated current image part is greater than a discrimination threshold value.

Thus, when the lost packet contains data corresponding to the decoding of an image part with a surface of greater value than a discrimination threshold value, it is considered important for the image quality, that is to say the visual impact of the lost packet on the image is high. Consequently, the receiving device requests the retransmission of the lost packet.

On the contrary, if the lost packet contains data corresponding to the decoding of an image area of value less than the discrimination threshold value, the lost packet is considered of low importance for the quality of the image, that is to say that the visual impact of the lost packet on the image is not high. Consequently, the receiving device does not request the retransmission of the lost packet.

Thus, the network is not unnecessarily congested with packets of low importance.

According to a practical implementation of the invention, the area of the current image part is estimated from the packet information of the current image to decode and from the information of a decoded preceding image.

Consequently, the image area occupied by the data contained in each lost packet is estimated from an image decoded previously, prior to the decoding of the current image.

In practice, the image is divided into blocks, and the step of estimating the area comprises the following steps:
  estimating the number of items of data contained in the detected lost packets;
  estimating a complexity of the blocks of said current image; and
  estimating the number of current image blocks corresponding to each packet from the estimated number of items of data contained in the lost packets, from the number of items of data contained in received packets, and from the estimated complexity of the blocks of the current image.

Thus, from the sizes of the packets (estimated size in the case of a lost packet and size known by the receiving device in the case of a received packet) and from the number of items of data contained in each image block, the area occupied by each packet on the image to decode or current image (or number of blocks corresponding to each packet) is estimated.

Consequently, from this information, the receiving device is capable of generating a representation of the area of the image part corresponding to each packet (received and lost) on the image to decode.

On the basis of the above steps, the receiving device knows the area of a packet in numbers of blocks.

Thus, the higher the complexity of the blocks, the lower the number of blocks corresponding to the same packet.

On the contrary, the lower the complexity of the blocks, the higher the number of blocks corresponding to the same packet.

According to a preferred feature, the step of estimating the complexity of the blocks of the current image comprises the following steps:
  storing a motion vector of each block of the preceding image;
  measuring a complexity of the blocks of the preceding image; and
  predicting the complexity of each block of the current image from the stored motion vector and from the measured complexity of each block of the preceding image.

Consequently, the complexity of the blocks of the current image is predicted from the complexity of the blocks of the preceding image and from its motion vectors without requiring the decoding of the current image.

According to another embodiment, the step of estimating the importance criterion comprises a step of estimating a type of image corresponding to the data contained in said lost packet.

Thus, the receiving device estimates the image type from which the lost packet came. More particularly, the loss of data due to the loss of a lost packet is different according to the type of that image.

According to the MPEG standard, images may be INTRA, INTER of P type and INTER of B type. INTRA (or type I) images are images in which the coding is performed without reference, that is to say that it does not depend on other images. INTER images of P type (or P type images) are coded on the basis of a reference image by taking into account the motion between the reference image and the image to code. INTER images of B type (or B type images) are coded on the basis of two reference images.

The reference images used for the coding of INTER images (P type and B type) are in general images of I or P type. B type images are rarely employed as reference images.

Thus, the I type images are the images considered as the most important. The P type images have a lower importance than the images of I type, and the B type images are those considered as the least important.

According to a preferred feature, the step of estimating a type of current image comprises a step of measuring the number of packets corresponding to the current image.

The number of packets of the same image is representative of the type of image.

According to another preferred feature, at the step of requesting retransmission, the lost packet is requested when the number of packets measured is greater than a discrimination threshold value.

When the number of packets of an image is greater than the discrimination threshold value, the receiving device considers that the lost packet is important and requests its retransmission.

According to a second aspect, the present invention concerns a device for processing a coded data stream of a current image on a receiving device, the data stream being organized into packets, the processing device comprising means for detecting a lost packet.

According to the invention, the device comprises:
  means for estimating, prior to the decoding of said current image, an importance criterion of said lost packet, said importance criterion being determined from at least one decoded preceding image; and
  means for requesting retransmission of said lost packet depending on the estimated importance criterion.

According to a third aspect, the present invention concerns a telecommunications system comprising several terminal devices linked across a telecommunications network, comprising at least one terminal device equipped with a device as succinctly described above.

According to a fourth aspect, the present invention concerns an information storage means which can be read by a computer or a microprocessor holding instructions of a computer program, adapted to implement a method as succinctly described above, when the stored information is read by the computer or the microprocessor.

In a particular embodiment, this storage means is partially or totally removable.

According to a fifth aspect, the present invention concerns a computer program product able to be loaded into a programmable apparatus, comprising sequences of instructions for implementing a method as succinctly described above, when that computer program product is loaded into and executed by the programmable apparatus.

As the advantages of the data processing device, as well as the particular features and advantages of the telecommunications system, of the information storage means and of the computer program product are similar to those of the data processing method, they will not be repeated here.

Still other particularities and advantages of the invention will appear in the following description.

BRIEF DESCRIPTION OF THE DRAWINGS

In the accompanying drawings, given by way of non-limiting example.

DETAILED DESCRIPTION OF PARTICULAR EMBODIMENTS

Figure 2:
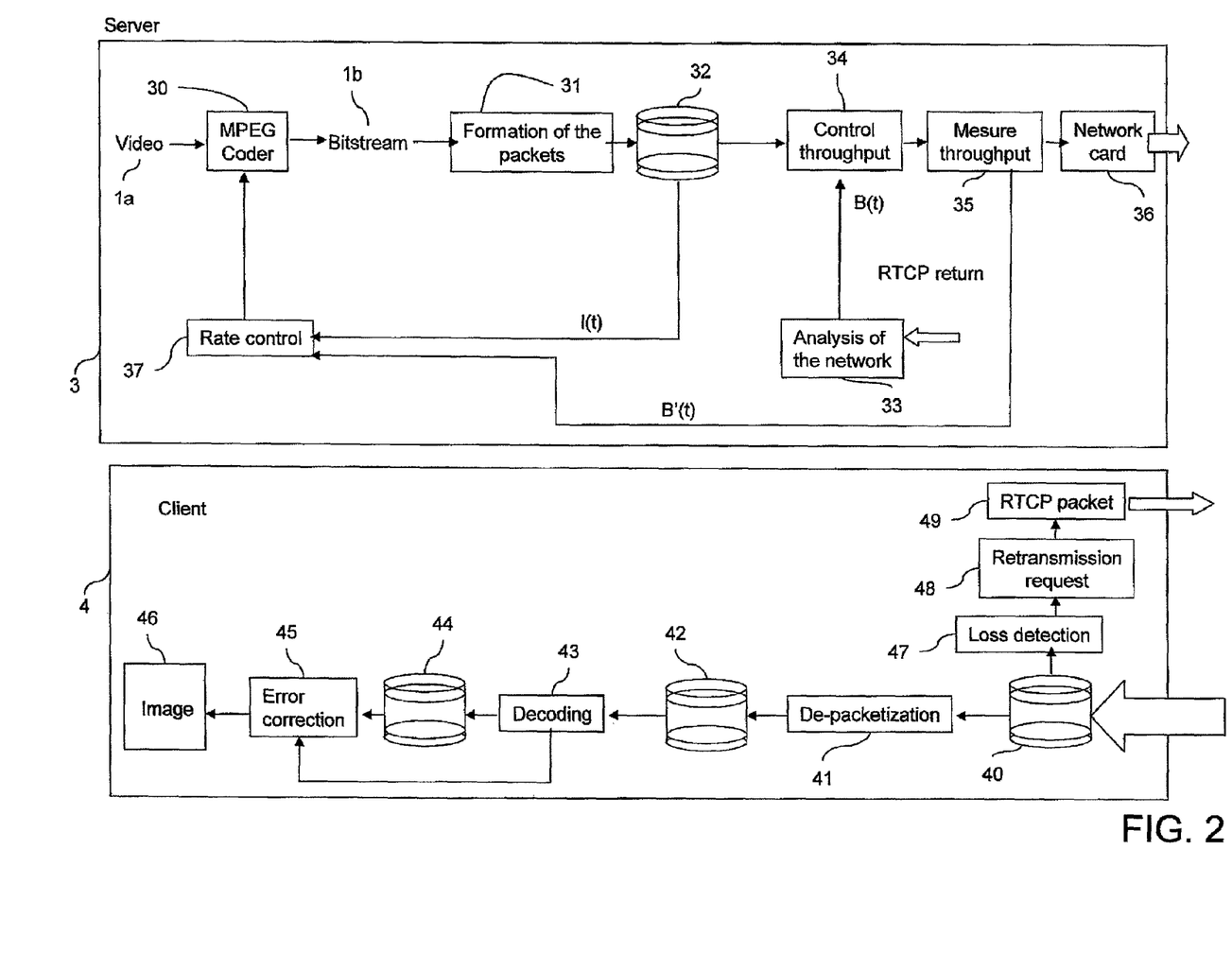
FIG. 2 is a diagram of the context of the present invention.

With reference to FIG. 2, a description will first of all be given of the context in which the invention is situated.

The general context of the invention is the transmission of a coded data stream across a communication network between a sending device or server and at least one receiving device or client.

The data stream 1a is for example a video data stream. This video data stream 1a is transmitted by a server 3 and received by a client 4 at which the video is displayed.

Data 1a (here video data) to transmit across the communication network are coded by a coder 30 in order to form a coded data stream 1b.

In the particular embodiment described here, this coded data stream 1b is a coded bitstream.

For example, the standard used for the coding is an MPEG standard, for example MPEG-1, MPEG-2 or MPEG-4.

Here, the coded bitstream 1b represents video data. Of course, the coded bitstream could represent other types of data, for example audio data.

Network packets are formed by a packetizer 31 from the coded bitstream 1b. These network packets are stored in a buffer memory 32.

In the described embodiment, the communication network is a packet-switched communication network.

The protocol used for the transport of the data in this type of network is for example RTP ("Real-time Transport Protocol"). Thus, the network packets are of RTP type.

In each network packet, two parts in particular can be distinguished: A first part corresponds to data representing the start of a packet or a network header, for example an RTP header. A second part corresponds to the useful data (or payload) of the network packet, comprising the data of the coded data stream. The network header comprises information concerning for example the number of the network packet indicating the index of the network packet in the order of sending or sequence number of the packet, a marker indicating that a packet is the last component of an image, etc.

Means 33 for analysis of the network continuously analyzing of the state of the network in order to adapt the throughput of the packets to the network optimally and thus to use the bandwidth of the network efficiently and without congesting the network.

A scheduler module 34 or throughput control module adapts the throughput speed of the packets according to the number of packets lost and the estimated delay for transmission between the server 3 and the client 4. More particularly, the throughput of the packets is carried out at a high speed when the number of lost packets is low or zero, and when the transmission delay is short.

If the number of lost packets is high, the throughput speed is reduced.

The means 33 for analysis of the network analyze network packets sent back by the client or RTCP ("Real-time Transport Control Protocol") packets. On the basis of this analysis, the throughput speed of the packets is deduced, and consequently the bandwidth B(t) is estimated. This information on the throughput speed of the packets or bandwidth B(t) is transmitted to the throughput control module 34.

The RTCP packets come from clients 4 and contain information relative to the losses of packets between the server and the client. For example, an RTCP packet may contain one or more sequence numbers of lost packets.

Thus, depending on the analysis of the network, the control of the network congestion is provided by adapting the throughput speed of the packets 1. A network card 36 has the task of transmitting the network packets over the communication network. The network packets are adapted beforehand to the format used for the network. For example, in the case of an IP ("Internet Protocol") network, the packets are formed in the form of UDP ("User Datagram Protocol") packets, as well as in the form of IP packets.

Depending on the throughput speed of the packets and how full the buffer memory 32 is, the coding speed is controlled by rate control means 37 in order to slow or accelerate the formation of the bitstream 1b and of the network packets. Thus, when the buffer memory 32 has no more free space, the coder 30 waits for packets stored in the buffer memory to be conveyed to the network card 36.

Throughput measuring means 35 are adapted to measure the throughput speed of the network packets to the network card 36. This measurement B'(t) is transmitted to the rate control means 37.

Thus, if the available bandwidth is suddenly reduced, the network card transmits the packets to the network more slowly. This new value of the throughput speed or bandwidth B'(t) is measured by the throughput measuring means 35 and transmitted to the rate control means 37.

The rate control means 37 will thus act on the coder 30 in order to slow or accelerate the formation of the bitstream 1b.

It will be noted that when the value of the available bandwidth is constant, the bandwidth value B(t) estimated by the network analysis means 33 is similar to the bandwidth B'(t) measured by the throughput measuring means 35.

A client 4 retrieves the network packets from the communication network and stores them in a first buffer memory 40.

The client 4 analyzes the sequence number of each network packet. The sequence number of a packet is located, as stated above, in the network header of the packet.

Thus, using the sequence numbers, the client 4 identifies the lost network packets.

The packets are depacketized by a depacketizer 41. Depacketizing a packet consists of removing the packet header and assembling the useful data or payload of the network packets to form a new bitstream, which is stored in a second buffer memory 42.

The stored bitstream is then decoded by a decoder 43 and images are obtained. These images are stored in a third buffer memory 44.

If network packets are lost, an error correction module 45 uses interpolation methods in order to retrieve the data missing from an image.

These image correction methods may for example be of INTRA type, when the interpolation used is spatial, and of INTER type when the interpolation used is temporal.

Once the error correction methods have been applied to the image, this is displayed in display means 46.

Furthermore, a loss detection module 47 analyzes the packets stored in the first buffer memory 40 in order to detect whether there have been packets lost during the transmission over the network. As described above, the loss of a network packet is detected via the analysis of the sequence numbers of the packets.

When lost network packets are detected, retransmission requesting means 48 send a request for retransmission of those lost packets. The sending of this retransmission request consists, for example, in sending RTCP packets 49.

Figure 3:
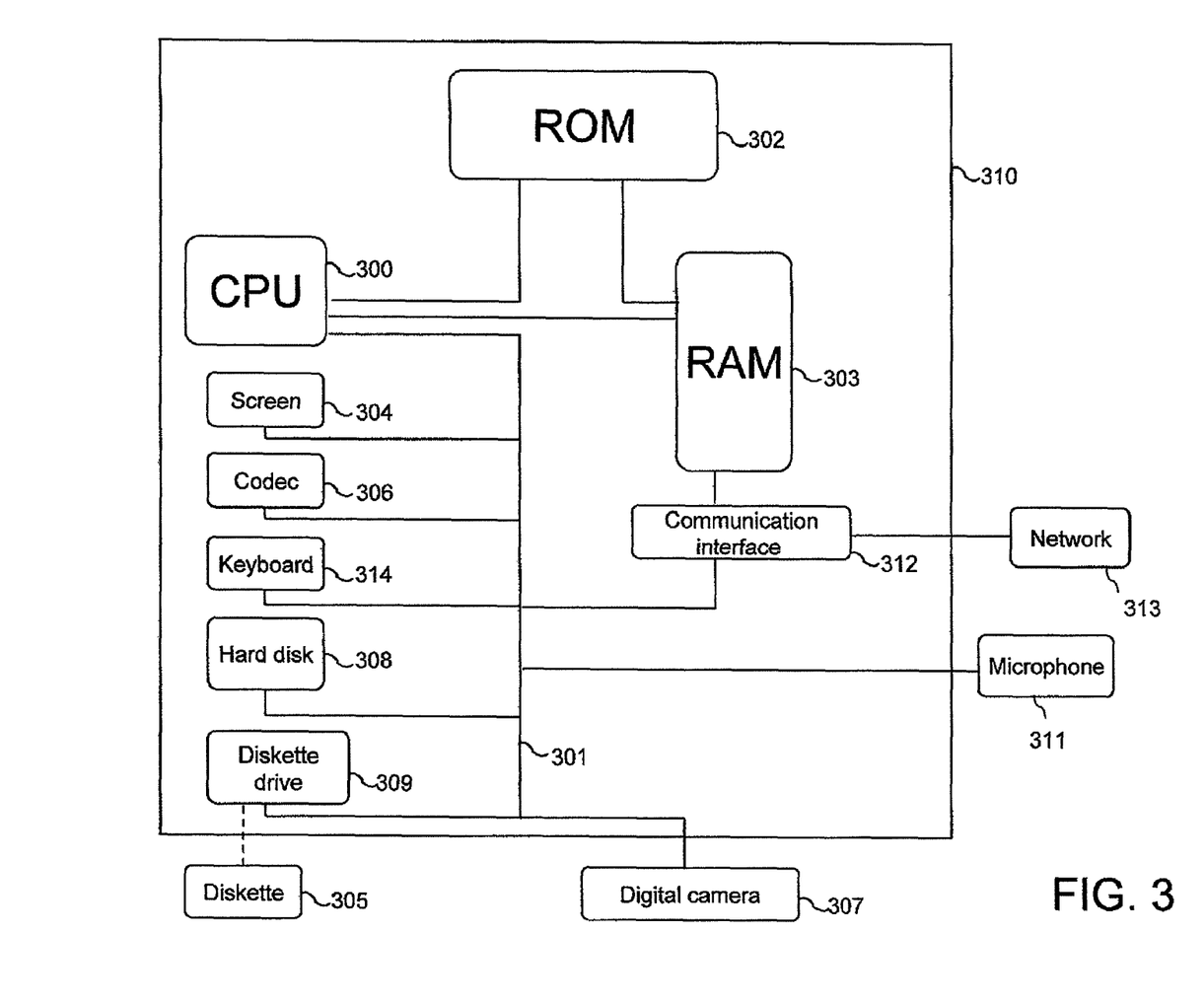
FIG. 3 is a diagram of a particular embodiment of an apparatus capable of implementing the present invention.

FIG. 3 illustrates a device implementing a method of processing a coded data stream in accordance with the invention, in a particular embodiment.

This device is for example a multimedia reader 310.

The device 310 comprises a communication interface 312 connected to a network 313 adapted to receive digital data to process by the device in the context of the implementation of the invention. The device 310 also comprises a storage means 308 such as a hard disk. It also comprises a drive 309 for a disk 305. This disk 305 may for example be a diskette, a CD-ROM, or a DVD-ROM, a memory card or a USB peripheral, for example. The disk 305 like the hard disk 308 can contain data processed according to the invention as well as the program or programs implementing the invention which, once read by the device 310, will be stored on the hard disk 308. As a variant, the program or programs enabling the device to implement the invention can be stored in read only memory 302 (called ROM or "Read Only Memory"). In a second variant, the program or programs may be received in order to be stored in an identical fashion to that described previously via the communication network 313.

This same device has a screen 304 for displaying the data processed or serving as an interface with the user, who can thus select other data to process, using the keyboard 214 or any other means (a mouse, wheel or stylus, for example).

The central processing unit 300 (referred to as CPU in the drawing) executes the instructions relating to the implementation of the invention, which are stored in the read only memory 302 or in the other storage means. For example, the central processing unit carries out the steps illustrated in FIG. 4 and described later. On powering up, the processing programs stored in a non-volatile memory, for example the ROM 302, are transferred into the random access memory RAM ("Random Access Memory") 303, which will then contain the executable code of the invention, as well as registers for storing the variables necessary for implementing the invention.

In more general terms, an information storage means, which can be read by a computer or microprocessor, integrated or not into the device, and which may possibly be partially or totally removable, stores a program implementing the data processing method according to the invention.

The central processing unit 300 comprises a device for processing a coded data stream adapted to implement the method of data processing in accordance with the invention and which will be described below.

In particular, the central processing unit 300 comprises means for estimating an importance criterion, means for requesting retransmission, means for estimating an image area, means for estimating the number of items of data contained in a lost packet, means for estimating, measuring and predicting a complexity, means for estimating the number of image blocks corresponding to a packet, means for measuring the variance, means for estimating the image type and means for measuring the number of packets corresponding to an image.

A device comprising these means is adapted to implement the method of processing coded data described later.

The communication bus 301 affords communication between the different elements included in the device 310 or connected to it. The representation of the bus 301 is non-limiting and in particular the central processing unit 300 unit may communicate instructions to any element of the device 310 directly or by means of another element of the device 310.

The device 310 further comprises a codec 306, for example in the form of a standard chip, used by the central processing unit 300 in a conventional manner via the bus 301.

Figure 4:
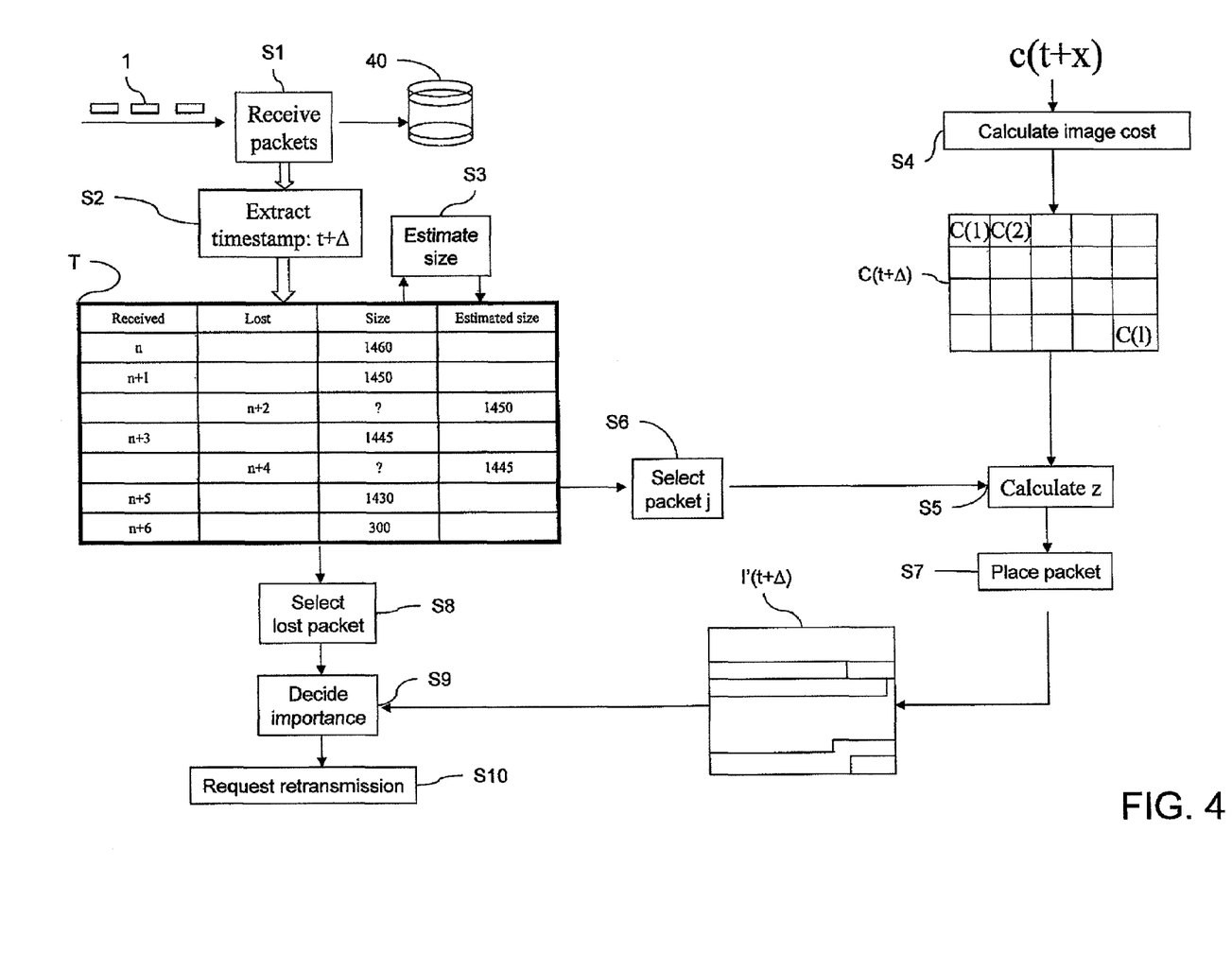
FIG. 4 is a flow diagram representing a first embodiment of the method in accordance with the invention.

With reference to FIG. 4 a description will now be given of a first embodiment of the invention.

Network packets 1 arrive at the client at a receiving step S1 and are stored in the first buffer memory 40. A step S2 of extracting a timestamp from the packets received is implemented. The timestamp is extracted from the packet header.

The timestamp represents a point in time taken with reference to an internal clock of the video server. The packets comprising the same timestamp value form part of the same image.

Once the network packets 1 belonging to the same image (which amounts to saying the network packets with the same timestamp) have been received, a table T is constructed comprising, for each network packet received, the sequence number and the size of the packet. This table also comprises the sequence number of the lost packets and an estimation of their size.

At an estimating step S3, the size of the lost packets is estimated from the sizes of the packets received 1. According to one embodiment, the size of a lost network packet is estimated as the mean of the sizes of the network packet of closest lower sequence number and of the one of closest higher sequence number.

If the lost network packet is the last network packet, that is to say that there is no network packet of higher sequence number, the size of the network packet 1 received (of the same timestamp) of closest sequence number is attributed.

Furthermore, the complexity c(t+Δ) of the image to decode or current image I(t+Δ) is estimated, this current image I(t+Δ) being divided into blocks or macroblocks. The estimation of the complexity of the macroblocks of the current image will be described below. Here, it is assumed that the estimation of the complexity of each macroblock of the current image I(t+Δ) or complexity map of the current image c(t+Δ) is known.

On the basis of the complexity of each macroblock of the current image I(t+Δ), the number of items of data contained in each macroblock of the current image is calculated at a step S4 of estimating the number of items of data. Thus, at this estimating step S4, an image C(t+Δ) comprising the number of items of data of each macroblock is obtained. In this example, the number of items of data is expressed in bytes.

In the embodiment described, the size of the current image I(t+Δ), or size of the image formed by the network packets received with a timestamp (t+Δ), is calculated from the table T comprising the size of the packets received and lost. Thus, the size of the image $C_T$ is calculated by the following formula:

$$C_T = \sum_{i=n}^{n+k} \text{Packet\_size}(i)$$

In this formula, n corresponds to the first sequence number of the network packets 1 and k to the number of network packets belonging to the current image I(t+Δ).

Moreover, the quantity of data, here the quantity of bits in a macroblock, is calculated according to the following formula known to the person skilled in the art:

$$H(q) = \frac{e}{\ln 2} \frac{\sigma^2}{q^2} = C_i$$

in which σ is the variance of the macroblock of index i and q its quantization step size. The quantity of bits of each macroblock has a linear relationship with the square of the variance $\sigma^2$, equal to its complexity ($c_i = \sigma^2$) in this embodiment. The linearity coefficient α is a function of the quantization step size q.

The linearity coefficient α may be calculated as follows:

$$C_T = \sum_{i=1}^{I} \alpha \cdot c_i$$

In this formula, I is the number of macroblocks into which the image is divided.

Thus;

$$\alpha = \frac{C_T}{\sum_{i=1}^{I} c_i}$$

On the basis of this linearity coefficient and of the complexity of each macroblock, the number of bits of each macroblock is estimated according to the following formula:

$$C_i = \alpha \cdot c_i$$

Thus, a map C(t+Δ) is obtained representing the number of bits for each macroblock of the current image.

In order to estimate the area of the current image occupied for each packet, the following equation is used:

$$\sum_{i=m}^{m+z} C_i = 8 \cdot \text{size}(j)$$

in which "size(j)" represents the size of the network packet 1 of sequence number j (in bytes), m corresponds to the index of the last macroblock used in the calculation for the preceding packet (packet (j−1)), and z corresponds to the index of the last macroblock used in the calculation for the current packet (packet j).

The operand "size(j)" is multiplied by 8 since the number of items of data of the macroblocks is expressed in bits.

Thus, in this example, the calculation of the area occupied by each packet 1, corresponds to calculating the number of macroblocks corresponding to a network packet, that is to say the value of the index z. This is implemented at a calculating step S5.

Thus, in order to calculate the area occupied by each network packet 1, a first network packet 1 is selected at a selecting step S6 and its size is multiplied by 8 at the calculating step S5. A first macroblock m is selected and it is checked whether the number of bits C(m) of the macroblock m is greater than or equal to 8*size(j). If this is not the case, a second macroblock m+1 is selected, and it is checked whether the sum of the numbers of bits of the macroblocks m and m+1 (C(m)+C(m+1)) is greater than or equal to 8*size(j). This process is continued until the value of the index z is found for which the sum of the numbers of bits of the macroblocks (C(m)+C(m+1)+ . . . +C(m+z)) is the closest to 8*size(j). It is thus possible to calculate the number of macroblocks associated with a network packet 1.

Once the surface of a packet is known, a step S7 is carried out of placing the packet in a reconstruction I'(t+Δ) of the current image in which the area and the position of each network packet are represented.

The steps of selecting S6 a network packet 1, estimating the area of the packet S5 (or calculating the index z), the step of placing S7 the packet in the image I'(t+Δ) are repeated for each network packet of the current image I(t+Δ) or of the image of the same timestamp (t+Δ).

At a second selecting step S8 each lost packet is selected, and a deciding step S9 is then proceeded to, in which the decision is taken whether or not to request the retransmission of the lost packet according to an importance criterion. Thus, at this deciding step S9, the image I'(t+Δ) containing the estimation of the area and the position of each network packet 1 is used in order to know the area of the selected network packet.

When the estimated area corresponding to the selected network packet is greater than a discrimination threshold value, the selected lost packet is considered as important according to the importance criterion and is requested from the server 3 at a step of requesting retransmission S10.

On the contrary, when the estimated area is less than the discrimination threshold value, the selected lost packet is considered as of low importance according to the importance criterion and is not requested.

The second selecting step S8 and the deciding step S9 are repeated for each lost network packet of the current image I(t+Δ) or of the image of the same timestamp (t+Δ).

In this example, the discrimination threshold corresponds to a percentage of the area of the current image of value 20%. Thus, when a lost network packet occupies an area greater than 20% of the area of the current image, the lost network packet is requested from the server 3, and when the lost network packet occupies an area equal to or less than 20% of the area of the current image, the lost network packet is not requested from the server 3.

Of course, in other embodiments, the threshold value may have different values.

With the help of FIG. 5 a description will now be made of the estimation of the complexity c(t+Δ) from the current image used in the embodiment of FIG. 4.

As was described previously, network packets 1 are received at a receiving step S1 and stored in a buffer memory 40.

At an extracting step S2, information concerning the network packets 1 received is extracted from the header of the network packets and is stored. This information is the sequence number of the packets and their timestamp. In this example, five network packets 10, 11, 12, 13, 14 are received. These network packets belong to the same image to decode or current image I(t+Δ), and consequently, they have the same timestamp (t+Δ). On the basis of their sequence number, the lost packets are detected at a detecting step S11.

As described above, each network packet stored in the first buffer memory 40 is depacketized, at a depacketizing step S41, that is to say that the packet header is removed and a bitstream 1c is formed with the payload of the network packets 1. The bitstream 1c is stored in a second buffer memory 42. A part of the stored bitstream 1c is decoded in order to obtain an image I(t).

This image I(t) is decoded from the payload of the network packets received with a timestamp of value t.

As a matter of fact, there is a lag between the reception of the network packets 1 and the decoding step S43. This lag is in particular due to the access time in writing and reading the buffer memories 40, 42 and/or due to the number of network packets that are stored in the buffer memories 40, 42 before performing the depacketization or the decoding.

Thus, at the same time that the network packets 10-14 belonging to the current image I(t+Δ) are received at the receiving step S1 by the client 4, the preceding image I(t) is decoded at the decoding step S43.

The time lapsed between the reception of the network packets belonging to the preceding image and the reception of the network packets belonging to the current image is represented by Δ. This time Δ may have a higher or lower value. For example, the time Δ may have a value of 10 seconds in a streaming application, that is to say, when a video is viewed in real-time by a client, or several tens of milliseconds in a video conference.

At the same time that the decoding of the preceding image I(t) is carried out, a step S12 of storing motion vectors associated with the preceding image I(t) is implemented.

This step S12 of storing motion vectors will be described in more detail with the help of FIG. 7.

A motion vector is associated with each macroblock of the preceding image I(t).

The motion vectors are calculated by the coder 30 on coding an image and are calculated differently depending on the type of image. For example, if the coded image is a P type image, the motion vectors represent the motion of the macroblocks of the image relative to an image coded previously.

Next, depending on the image type, motion vectors are estimated between the preceding image I(t) and the current image I(t+Δ) at a step of estimating the vectors S13.

Moreover, a step S14 of calculating the complexity of the macroblocks of the decoded preceding image I(t) is implemented.

In this embodiment, measuring the complexity of the blocks comprises a step of measuring the variance of the luminance of the pixels contained in those blocks.

Of course, the complexity may be calculated by other methods.

Thus, the calculation of the complexity of each macroblock makes it possible to reconstruct an image or map c(t) representing the complexities of the macroblocks of the preceding image I(t).

The map c(t) representing the complexities of the preceding image I(t) and the motion vectors estimated at the step S13 of estimating the vectors, are used in order to estimate an image of complexity c(t+Δ) from the current image I(t+Δ).

Thus, at a projecting step S15, the complexity value of each macroblock is projected on the basis of the motion vector associated with the macroblock, that is to say according to the direction of movement of the motion vector. A map of projected complexity $c_p(t+\Delta)$ is thus obtained. In this map of projected complexity $c_p(t+\Delta)$, the complexity values are irregularly distributed.

In order to avoid this irregular distribution of the complexity values, an interpolation step S16 is implemented, The map of complexity c(t+Δ) is thus obtained from the current image I(t+Δ), which is employed in the method described in FIG. 4.

Figure 6:
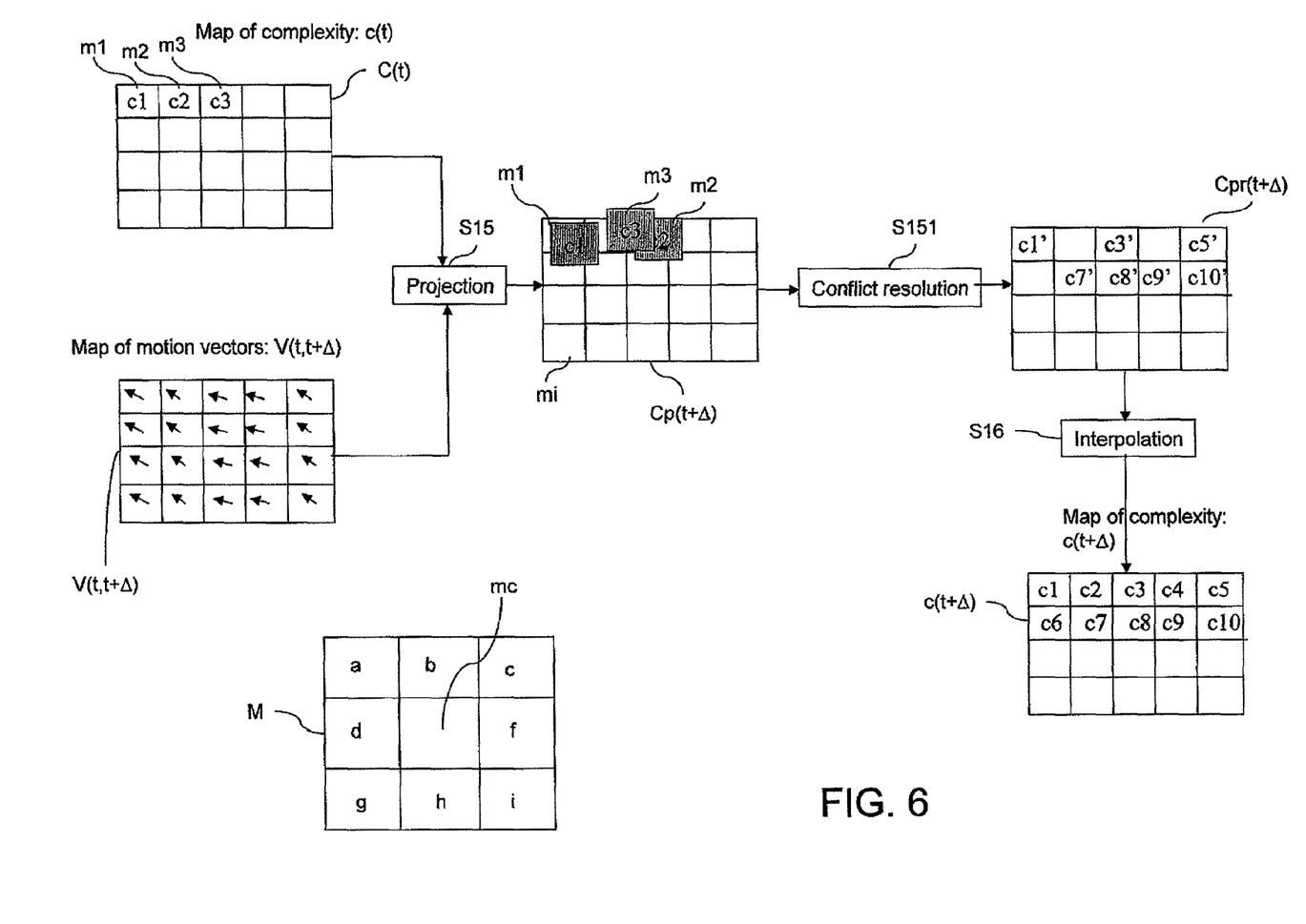
FIG. 6 is a flow diagram representing steps of FIG. 5.

FIG. 6 represents the steps of projecting S15 and interpolating S16 in more detailed manner.

An image or map of complexity c(t) of the preceding image I(t) and an image or map of the motion vectors V(t, t+Δ) are represented in FIG. 6. The map of motion vectors V(t, t+Δ) represents the motion of each macroblock between the image at time t (preceding image I(t)) and the image at time t+Δ (current image I(t+Δ)).

The projecting step S15 consists of projecting the macroblocks complexity value in the direction of the motion vectors associated with the macroblocks respectively.

For example, for the macroblock situated at the coordinates (x, y), the value of the associated complexity is c(x, y) and the associated motion vector is $\vec{v}(x,y)$. The projection consists of calculating a new position $(x_1, y_1)$ of the complexity for the macroblock situated at (x, y), according to the formula:

$$(x_1, y_1) = (x, y) + \vec{v}(x, y)$$

For example, on the map of projected complexity $c_p(t+\Delta)$, the macroblocks m1, m2, m3 of complexity c1, c2 and c3 are represented. These projected macroblocks m1, m2, m3 do not coincide with the division into macroblocks of the map of projected complexity $c_p(t+\Delta)$.

Thus, to reconstruct a map of regular projected complexity $c_{pr}(t+\Delta)$, a conflict resolution algorithm is implemented at a conflict resolution step S151.

In this embodiment, the conflict resolution algorithm consists of:
  when the center of the projected macroblock m1, m2, m3 is situated within a regular macroblock mi, the complexity of the projected macroblock m1, m2, m3 is attributed to the regular macroblock mi (as is the case of the projected macroblock m1 of complexity value c1); and
  when several centers of projected macroblocks m1, m2, m3 are situated within the same regular macroblock mi, the average of the complexities of the projected macroblocks m1, m2, m3 is attributed to the regular macroblock mi (such Is the case for the projected macroblocks m2 and m3 of complexity values c2 and c3 respectively).

Using this algorithm a map of regular complexity $c_{pr}(t+\Delta)$ is obtained. In this map of complexity $c_{pr}(t+\Delta)$ some macroblocks do not have any associated complexity. In order to resolve this, the interpolating step S16 is implemented, and a map of complexity c(t+Δ) is obtained. This complexity map is the map of complexity c(t+Δ) that is estimated and associated with the current image I(t+Δ).

For example, the interpolating step S16 may be implemented by means of median filtering. The application of median filtering consists in attributing a complexity value to a macroblock which does not have an associated complexity, on the basis of the median value of the complexities of a mask.

For example a mask M is situated centered on a macroblock mc which has no attributed complexity value. The complexity values of macroblocks adjacent to the macroblock mc are a, b, c, d, f, g, h and i. If these values are classified in the following order: c, f, h, i, g, b, d, a, g, the value situated in the middle of the list (that is to say g or b) is attributed to the macroblock mc.

Of course, other methods of interpolation may be employed.

Figure 5:
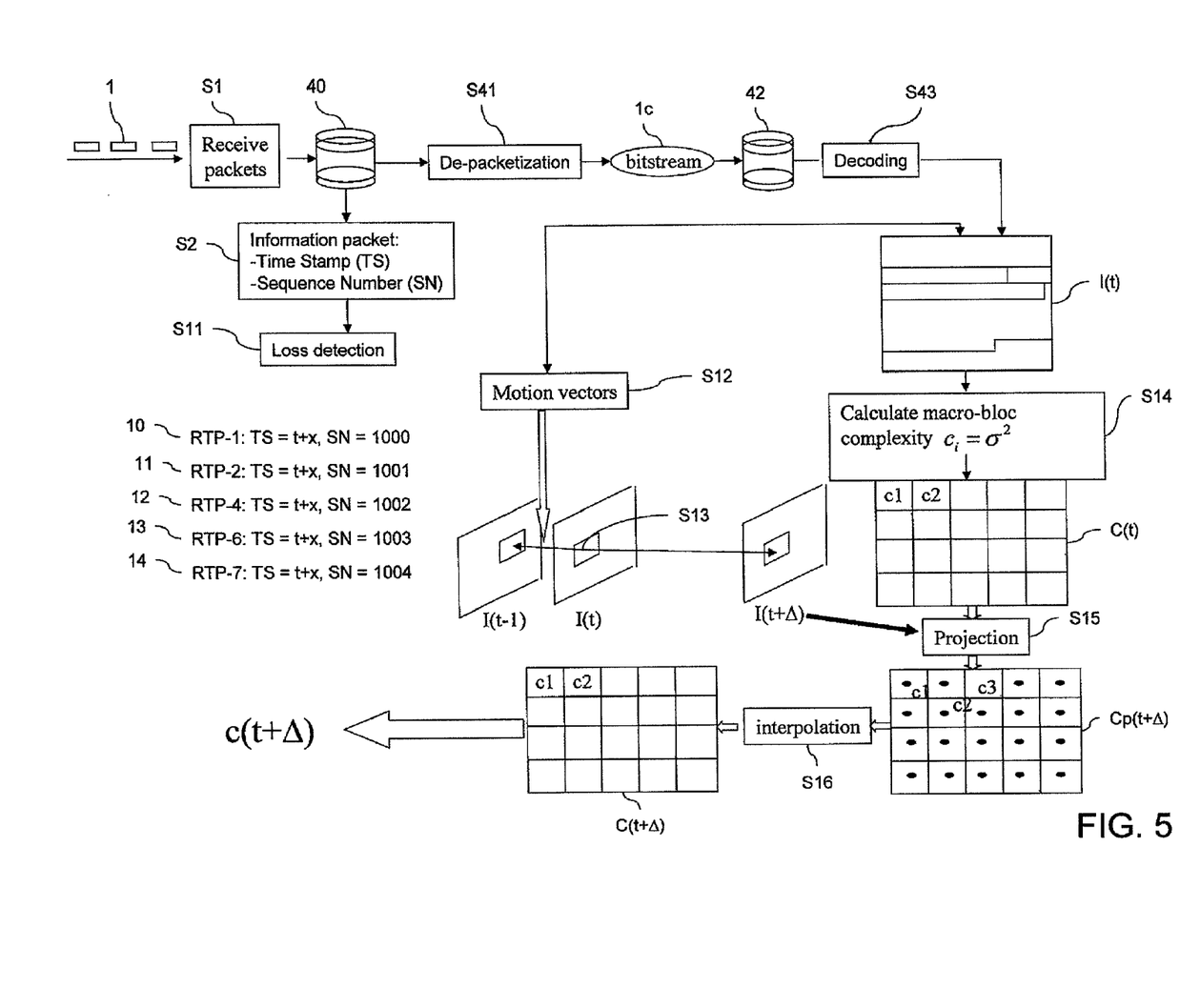
FIG. 5 is a flow diagram representing a part of the embodiment of FIG. 4.
Figure 7:
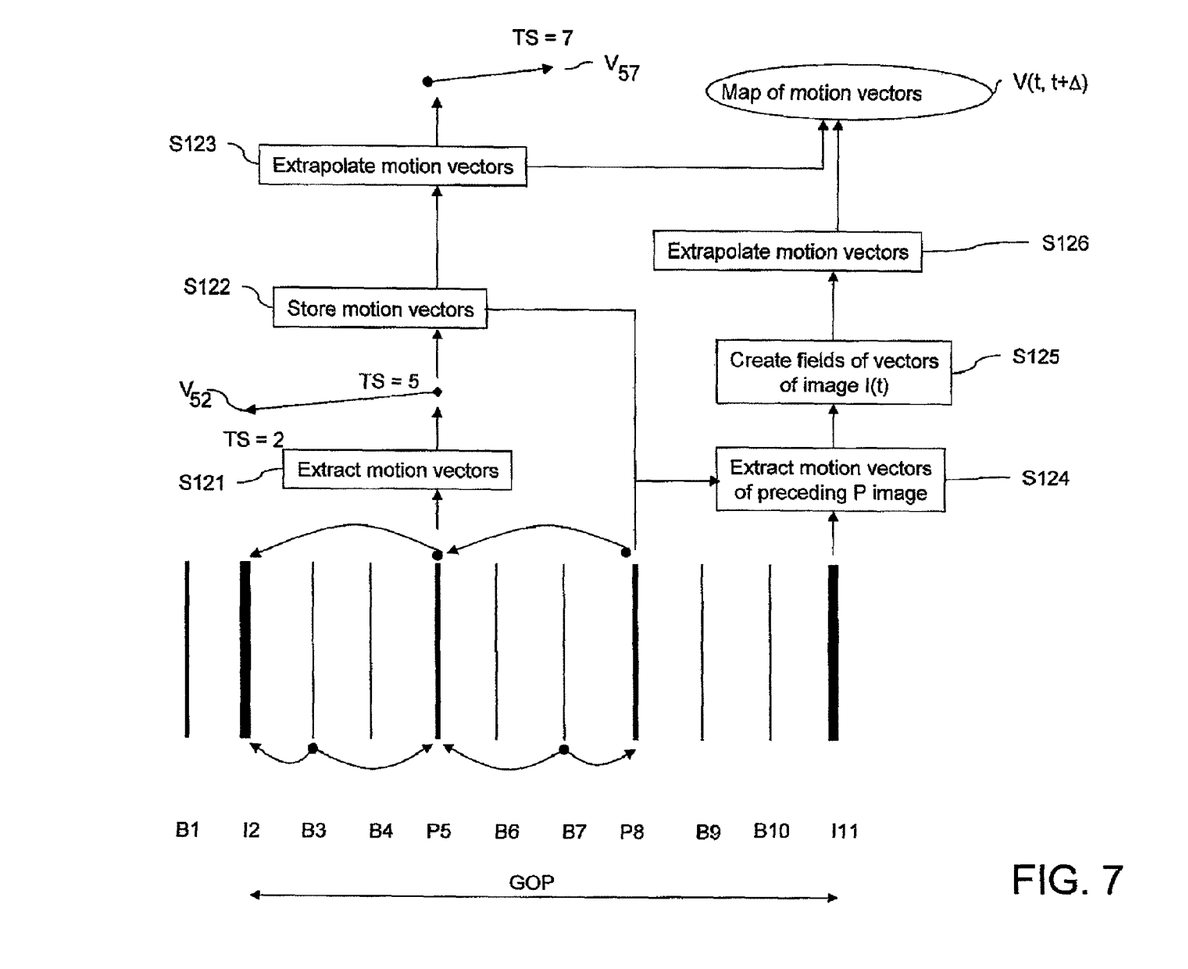
FIG. 7 is a flow diagram representing steps of FIG. 5.

FIG. 7 describes the step S12 of estimating the vectors of FIG. 5 in more detail.

FIG. 7 diagrammatically represents a GOP ("Group Of Pictures"). This GOP comprises INTRA images (I2, I11), P type INTER images (P5, P8) and B type INTER images (B1, B3, B4, B6, B7, B9, B10).

A description will now be made, by way of example, of the estimation of the motion vectors of the image P5 (P type INTER image). As stated above, this image is decoded and motion vectors are extracted at an extracting step S121 and stored at a storing step S122. The image P5 uses the image I2 as reference image, that is to say that the motion vectors $V_{52}$ associated with the image P5 point to the image I2.

On the basis of the motion vectors stored at step S122, a step S123 is carried out of extrapolating the motion vectors between the time t and the time t+Δ, respectively corresponding to the current image I(t+Δ) and the preceding image I(t).

Thus, if for example the vector between the image P5 (t=5) and the image I2 (t=2) is known and the vector $V_{57}$ between the time t=5 and the time t=7 is needed to be known, the direction of the vector $V_{52}$ must be inversed and its modulus must be multiplied by a factor of ⅔.

This same method is applied for the B type INTER images.

For the INTRA images, the method is slightly different. This is because these images do not comprise motion vectors since their coding is carried out without any temporal prediction. It is thus necessary to create those motion vectors. For this, a second step S124 is implemented of extracting the motion vectors of the preceding P type INTER image, here the image P8. These motion vectors were stored at the storing step S122.

At a step S125 of creating the vectors associated with the macroblocks, the motion vectors of the INTRA image I11 relative to the image P8 are deduced on the basis of those extracted motion vectors. For example, if the motion vector that is associated with the macroblock situated at the coordinates (x, y) of the image P8 is $\vec{v}(x,y)$ points to the image P5, that motion vector is inversed in order to obtain a position $(x_1, y_1)$ on the image I11. This position is calculated as follows:

$$(x_1, y_1) = (x, y) - \vec{v}(x, y)$$

Thus, the motion vector is associated with the macroblock of the image I11 to which that position belongs. If several vectors point towards the same macroblock, the vector associated with the macroblock is calculated by taking an average of the vectors.

Once the motion vectors of the image I11 have been deduced, if macroblocks without any associated motion vector exist, an interpolation method is implemented in order to obtain a motion vector associated with each macroblock of the image I11. One interpolation method is for example a median filtering.

On the basis of the motion vectors, a step S126 is carried out of extrapolating the motion vectors (similar to the extrapolating step S123) between the time t and the time t+Δ, respectively corresponding to the current image I(t+Δ) and the preceding image I(t).

With these extrapolated motion vectors, the map of motion vectors V(t, t+Δ) is obtained in which a motion vector is associated with each macroblock of the preceding image I(t).

This map of motion vectors V(t, t+Δ) is used in order to calculate the complexity map from the current image I(t+Δ) as described with the help of FIGS. 5 and 6.

Figure 8:
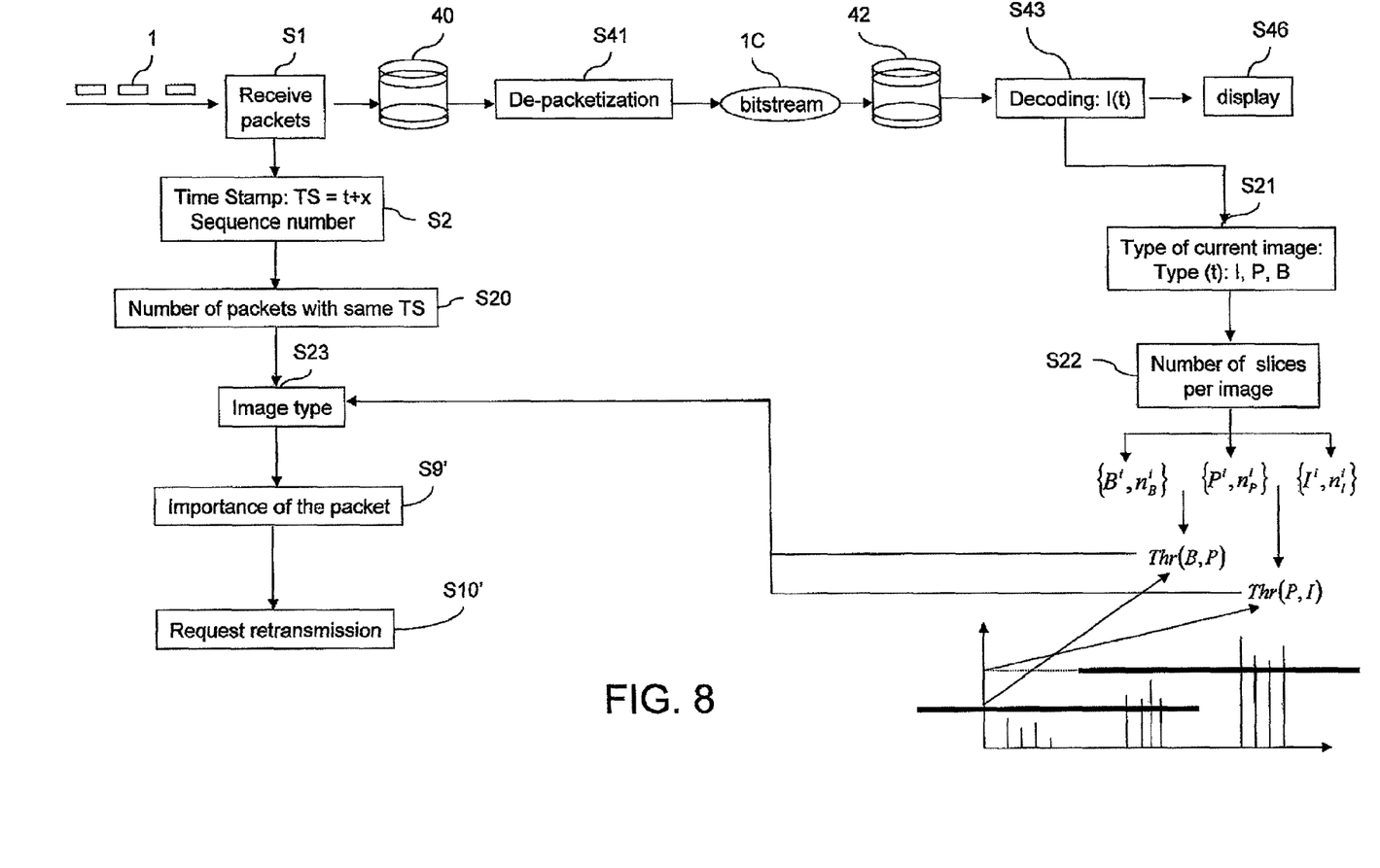
FIG. 8 is a flow diagram representing a second embodiment of the method in accordance with the invention.

A description will next be given, with the help of FIG. 8, of a second embodiment of the processing method in accordance with the invention.

As for the first embodiment described, the packets 1 are received by the client 4 at a receiving step S1 and are stored in a buffer memory 40.

For each packet 1 received, the sequence number and the timestamp are extracted at an extracting step S2.

At a counting step S20, the number of packets with the same timestamp is counted. According to one embodiment, the counting of the network packets 1 received is stopped when a network packet 1 of different timestamp is received.

Other embodiments of the implementation of stopping counting are possible, for example, when the number of network packets 1 received is greater than a predetermined value.

Furthermore, the network packets stored in the buffer memory 40 are depacketized at a depacketizing step S41 in order to form a bitstream 1c. The bitstream 1c is stored in a second buffer memory 42, from which the part corresponding to an image I(t) is decoded at the decoding step S43, to then be displayed at a displaying step S46.

This image I(t) is decoded on the basis of the received packets comprising a timestamp of value t, and will be called preceding image I(t).

A step S21 of analyzing the image type is implemented. As described above, the image may be INTRA or INTER (of P type or B type).

An image is divided into slices. In general, a slice corresponds to the payload of a network packet. Thus, the number of slices contained in the preceding image I(t) is extracted at a second extracting step S22.

In another embodiment, the decoder is informed of the number of the network packets corresponding to the preceding image I(t).

Figure 9:
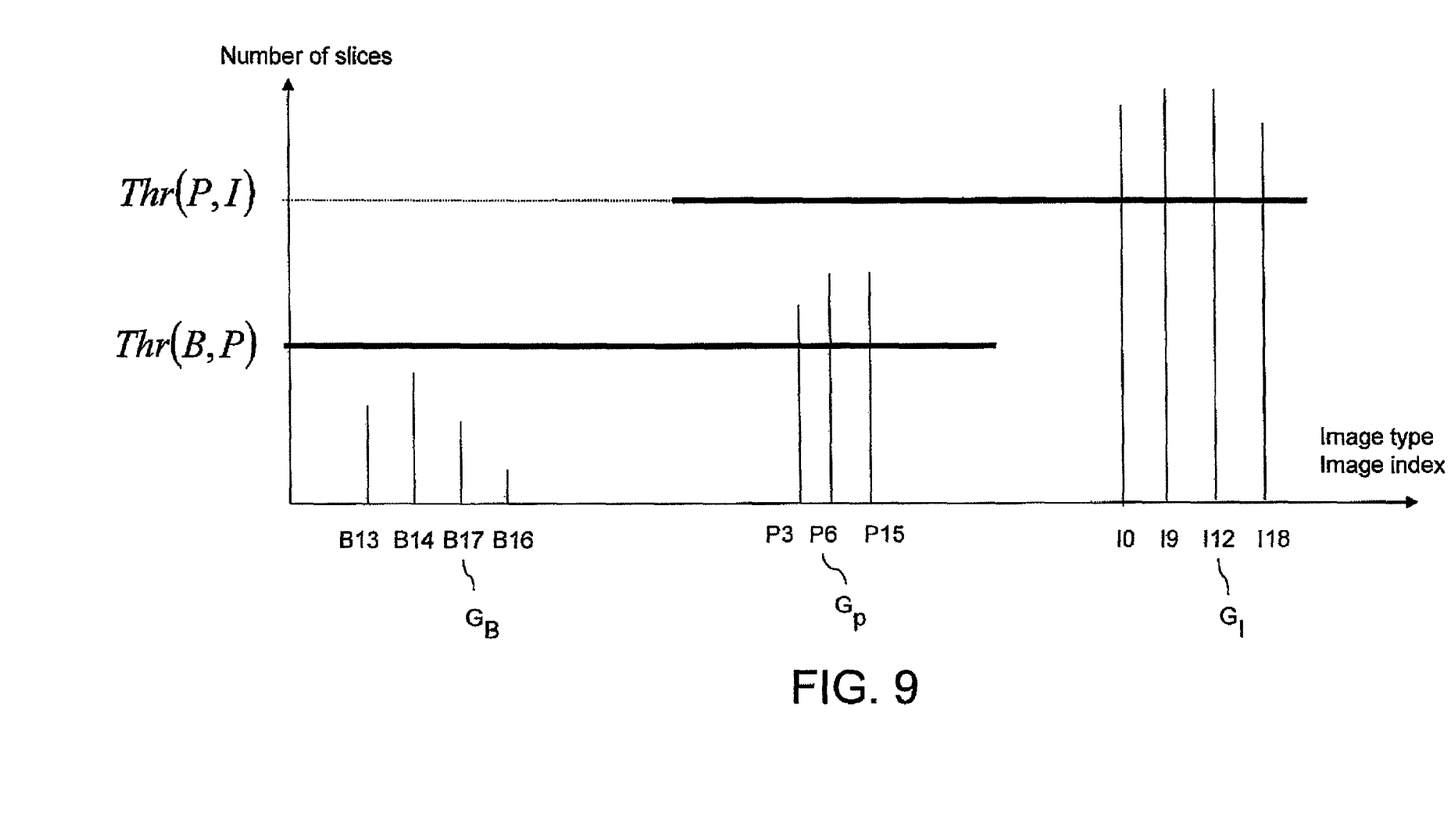
FIG. 9 is a diagram representing the number of packets of an image according to the image type.

On the basis of the image type and the number of slices of the image (parameters that are known in the preceding steps), a graph like that of FIG. 9 can be constructed.

This graph represents on the x-axis the type of image for a certain number of decoded images, and on the y-axis the number of slices contained in each image.

In this example, the images are grouped together by their type. Thus, a first group $G_B$ corresponds to the B type INTER images, a second group $G_P$ to the P type INTER images and a third group $G_I$ to the INTRA images.

Here, two values of discrimination threshold have been established. A first threshold value Thr(P, I) is determined as the average between the number of slices associated with the image I (from among the images I9, I10, I12 and I18) having the lowest number of slices and the number of slices associated with the image P (from among the images P3, P6 and P15) having the highest number of slices. A second threshold value Thr (B, P) is determined as the average between the number of slices associated with the image P (from among the images P3, P6 and P15) hg the lowest number of slices and the number of slices associated with the image B (from among the images B13, B14, B17 and B16) having the highest number of slices.

Of course, the number of images employed for producing this graph is variable.

Returning to FIG. 8, in which the graph illustrated is used in order to determine the type of the current image I(t+Δ) and consequently the importance of the lost packets belonging to that current image I(t+Δ).

At a determining step S23, the type of the current image I(t+Δ) is determined on the basis of the calculated discrimination threshold values Thr(P, I), Thr(B, P) and of the number of packets with the same timestamp counted at the counting step S20.

In this example, when the number of counted packets is less than the second discrimination threshold value Thr(B, P), the current image I(t+Δ) is of B type.

When the number of counted packets is greater than the second discrimination threshold value Thr(B, P) and less than the first threshold value Thr(P, I), the current image I(t+Δ) is of P type.

Lastly, when the number of counted packets is greater than the first threshold value Thr(P, I), the current image I(t+Δ) is of I type.

Thus, from the type of current image I(t+Δ), the importance of the lost packet may be determined at a step of determining the importance S9'.

According to the importance of the lost network packet, a step S10' of requesting retransmission is implemented or not.

In one embodiment, the step S10' of requesting retransmission is implemented when the number of packets measured is greater than the second discrimination threshold value Thr(B, P), that is to say when the lost network packets belong to an image of P type or I type.

In other embodiments, the step S10' of requesting retransmission is implemented when the number of packets measured is greater than the first discrimination threshold value Thr(P, I), that is to say when the lost network packets belong to an image of I type.

It will be noted that on calculating the threshold values of the graph of FIG. 9, if the number of slices associated with the I type image having the least slices is less than the number of slices associated with the P type image having the most slices, the first threshold value Thr(P, I) cannot be calculated. The same reasoning applies for the second threshold value Thr(B, P). Thus, if for example, only the second threshold value Thr(B, P) can be established, the packets belonging to images of type other than B type are considered important. If for example, none of the threshold values can be established, all the packets are considered important.

Thus, by virtue of the invention, it is possible to request the retransmission of the lost packets that are important for having a good image quality, without having to decode the current image.

Consequently, there are no long delays between the detection of a lost packet and the request for retransmission of the lost packet.

Furthermore, the communication network is not congested by the retransmission of lost packets which are not important.

Naturally, many modifications can be made to the embodiment described above without departing from the scope of the invention.

For example, it is possible to detect the regions of images in which the error correction algorithms are effective and in which they are less effective.

Thus, the importance of a lost packet is estimated on the basis of the image area corresponding to the lost packet and of the image region in which the lost packet is situated.

For example, when a lost packet falls in an image region where the algorithm is not effective, the packet is considered to be important and retransmission is requested.

On the contrary, when the lost packet falls in an image region where the algorithm is effective, the packet is considered of low importance and its retransmission is not requested.

What we claim is:

1. A method of processing a coded data stream of a current image on a receiving device, said data stream being organized into packets, the method comprising:
    a step of detecting a lost packet;
    a step of estimating, prior to the decoding of said current image, an importance criterion of said lost packet, said importance criterion being determined from at least one decoded preceding image;
    a step of requesting retransmission of said lost packet depending on said estimated importance criterion,
    wherein the step of estimating said importance criterion comprises a step of estimating an area of a current image part corresponding to the data contained in said lost packet; and
    a step of dividing the current image into blocks, wherein the step of estimating the area comprises the following sub-steps:
    estimating a number of items of data contained in detected lost packets;
    estimating a complexity of the blocks of said current image; and
    estimating a number of current image blocks corresponding to each packet from the estimated number of items of data contained in the detected lost packets, from a number of items of data contained in received packets, and from the estimated complexity of the blocks of the current image.

2. A processing method according to claim 1, wherein at the retransmission requesting step, the lost packet is requested when said area of said estimated current image part is greater than a discrimination threshold value.

3. A processing method according to claim 2, wherein said area of said current image part is estimated from the packet information of the current image to decode and from the information of a decoded preceding image.

4. A processing method according to claim 1, wherein said step of estimating the complexity of the blocks of the current image comprises the following steps:
    storing a motion vector of each block of said preceding image;
    measuring a complexity of the blocks of the preceding image; and
    predicting the complexity of each block of the current image from said stored motion vector and from said measured complexity of each block of the preceding image.

5. A processing method according to claim 4, wherein measuring the complexity of the blocks comprises a step of measuring variance of luminance of the pixels contained in said blocks respectively.

6. A processing method according to claim 1, wherein the step of estimating said importance criterion comprises a step of estimating a type of image corresponding to the data contained in said lost packet.

7. A processing method according to claim 6, wherein said step of estimating a type of current image comprises a step of measuring a number of packets corresponding to the current image.

8. A processing method according to claim 6 or 7, wherein at said step of requesting retransmission, the lost packet is requested when the number of packets measured is greater than a discrimination threshold value.

9. A device for processing a coded data stream of a current image on a receiving device, said data stream being organized into packets, the device comprising:
   means for detecting a lost packet;
   means for estimating, prior to the decoding of said current image, an importance criterion of said lost packet, said importance criterion being determined from at least one decoded preceding image;
   means for requesting retransmission of said lost packet depending on said estimated importance criterion,
   wherein said means for estimating said importance criterion comprise means for estimating an area of an image part corresponding to the data contained in said lost packet; and
   means for dividing the current image into blocks, wherein the means for estimating the area comprise:
   means for estimating a number of items of data contained in detected lost packets;
   means for estimating a complexity of the blocks of said current image; and
   means for estimating a number of current image blocks corresponding to each packet from the estimated number of items of data contained in the lost packets, from a number of items of data contained in received packets, and from the estimated complexity of the blocks of the current image.

10. A processing device according to claim 9, wherein said means for estimating the complexity of the blocks of the current image comprise:
    means for storing a motion vector of each block of said preceding image;
    means for measuring a complexity of the blocks of the preceding image; and
    means for predicting the complexity of each block of the current image from said stored motion vector and from said measured complexity of each block of the preceding image.

11. A processing device according to claim 10, wherein said means for measuring the complexity of the blocks comprise means for measuring variance of luminance of the pixels contained in said blocks respectively.

12. A processing device according to claim 10 or 11, wherein the means for estimating said importance criterion comprise means for estimating a type of current image corresponding to the data contained in said lost packet.

13. A processing device according to claim 12, wherein said means for estimating a type of current image comprise means for measuring a number of packets corresponding to the current image.

14. An information storage device which can be read by a computer or a microprocessor holding instructions of a computer program, wherein it is constructed to implement a method according to claim 1, when said information is read by said computer or said microprocessor.

15. An information storage device according to claim 14, wherein the information storage device is partially or totally removable.

16. A processing method according to claim 1, wherein the current image is a coded image.

17. A processing device according to claim 9, wherein the current image is a coded image.

* * * * *